Patented Feb. 5, 1946

2,394,502

UNITED STATES PATENT OFFICE 2,394,502

OPALESCENT GLASS AND METHOD OF MAKING SAME

Woldemar Weyl and Norbert J. Kreidl, State College, Pa., assignors to Monsanto Chemical Company, a corporation of Delaware No Drawing. Application September 10, 1941, Serial No. 410,292

6 Claims. (Cl. 106—53)

This invention relates to an opal glass composition.

It is one object of this invention to provide a glass composition which may be blown into various shapes without the development of surface defects such as roughness, etc.

It is another object to provide an opal glass composition which will not crystallize during working or molding.

Opal glasses have been known and produced for a great many years. At the present time such opal glasses are generally produced by the incorporation of cryolite or of sodium silico fluoride in the glass melt, making what is known as a fluoride opal.

Still earlier it was the practice, before the discovery of fluoride opals, to employ bone ash as an opacifying agent in glass. Bone ash opacified glasses however were generally unsatisfactory and hence upon the discovery of fluorine opals they were gradually superseded by the latter type of glass. The replacement of the bone ash opals by the fluoride opals is generally believed to be due to the fact that the bone ash opals exhibited an undesirable tendency to develop surface defects such as roughness which is now believed to be due to excessive crystal growth during cooling.

We have now found that the opacifying agent in the earlier bone ash opal glasses was partly, hydroxy apatite, and that the prior defects were due to the formation of this substance as a part of the opacifying phase.

Bone ash when free of organic materials contains approximately the following amounts of the various constituents:

| | Per cent |
|---|---|
| Tricalcium phosphate | 84 |
| Trimagnesium phosphate | 2 |
| Calcium carbonate | 10 |
| Calcium fluoride | 4 |

From the above analysis it will be noted that bone ash generally contains a small amount of fluorine. However, it is important to note for the understanding of the present invention that the amount of calcium fluoride present is insufficient to form fluorapatite with the calcium or other divalent elements and $P_2O_5$ present so that there was always some hydroxyapatite present.

We have now found that a much more satisfactory opacification of glass may be obtained if the composition of the glass is so adjusted that it contains an excess of fluorine over that necessary to produce the mineral fluorapatite which has the formula: $3Ca_3(PO_4)_2.CaF_2$. The employment of an excess of fluorine over that called for by the formula above assures that all of the calcium phosphate is present as the fluorapatite and that the hydroxy apatite shall be substantially absent.

The following examples illustrate the production of typical fluorapatite opal glasses according to our invention.

Example 1

Mix together the following ingredients and melt in a glass furnace:

| | Pounds |
|---|---|
| Sand ($SiO_2$) | 260 |
| Barium boro silicate | 18.5 |
| Barium carbonate | 7.5 |
| Borax ($Na_4B_2O_7$ $10H_2O$) | 4 |
| Limestone ($CaCO_3$) | 17.5 |
| Nephelin Syenite | 75.5 |
| Tetrasodium pyrophosphate | 75 |
| Sodium nitrate | 8 |
| Sodium carbonate | 65 |
| Litharge | 22.0 |
| Fluorspar | 33.0 |
| Arsenic trioxide | 3.0 |

In the above composition the phosphorus bearing salt is supplied as tetrasodium pyrophosphate, which as is noted will supply sufficient of the phosphorus pentoxide together with an appreciable amount of the soda necessary.

It is, of course, possible to supply the $P_2O_5$ necessarily present, as any other suitable salt of phosphorus. The following composition illustrates the use of a very pure form of apatite which supplies calcium, $P_2O_5$ and fluorine to the glass body.

Example 2

| | Pounds |
|---|---|
| Sand ($SiO_2$) | 259.5 |
| Barium boro silicate | 18.5 |
| Borax ($Na_4B_2O_7$ $10H_2O$) | 4 |
| Barium carbonate | 7.5 |
| Nephelin Syenite | 75 |
| Tetrasodium pyrophosphate | 61.0 |
| Sodium nitrate | 8.0 |
| Sodium carbonate | 72.5 |
| Litharge | 22.0 |
| Fluorspar | 32.0 |
| Apatite | 19.0 |
| Arsenic | 3 |

The apatite herein added is a mineral of very high purity containing less than approximately .1% of iron. The above ingredients are melted down and molded into glassware for various purposes.

In the table below we give three examples of fluorapatite opal glasses employing our invention and in the fourth column we give the preferred range of the constituents which are therein employed:

| Constituent | Composition of glass | | | Preferred range |
|---|---|---|---|---|
| | 1 | 2 | 3 | |
| | Per cent | Per cent | Per cent | Per cent |
| $SiO_2$ | 69 | 56.8 | 62 | [1] 54-66 |
| $Al_2O_3$ | 3 | 3.4 | 5.0 | 0-6 |
| $Na_2O+K_2O$ | 15 | 15.8 | 14 | 12-17 |
| $CaO$ | 5 | 6.2 | 10 | 0-12 |
| $BaO$ | 5 | 1.8 | 0 | 0-4 |
| $PbO$ | 5 | 4.0 | 0 | 0-5 |
| $F$ | 3 | 3.0 | 4.0 | 2.5-5 |
| $B_2O_3$ | 0 | .75 | 0 | [2] |
| $As_2O_3$ | 0 | 1.0 | 0 | 0-1 |
| $P_2O_5$ | 5 | 7.25 | 5.0 | 4-9 |
| | 100 | 100.00 | 100.0 | |

[1] In borosilicate glasses less.
[2] From 0 to about 50 in borosilicate glasses.

In general the following considerations govern the range of constituents shown in the table above.

Silica is, of course, employed since it is a convenient and cheap glass forming mineral. Its content should not be increased above that shown, since high viscosities are encountered which make workability difficult.

Some $Al_2O_3$ is desirably incorporated in our fluorapatite opal glass and is useful for extending the working range of the glass and also for avoiding devitrification. It moreover prevents attack upon refractories and decreases the amount of opacifiers employed.

Sodium and potassium should be restricted to the amount necessary for fluxing since excessive amounts interfere with fluorapatite opacification. Other alkali metals such as lithium should be absent because of the strong fluxing effect of this element. The present invention is to be distinguished from the opal glasses which have been produced using such minerals as amblygonite—a lithium containing mineral—where the opacification is produced by gaseous silicon fluoride.

CaO, BaO and PbO as a group are necessary for opacification since they enter into the opacifying phase by the formation of apatite bodies or bodies consisting of partially substituted apatite containing apatite. However, not all of these oxides are equally useful. Lime is the preferred and cheapest material to employ since it enters into the production of fluorapatite

$$3Ca_3(PO_4)_2 \cdot CaF_2$$

Barium oxide and lead oxide decrease the crystal formation and growth particularly in the desirable working range of temperature.

Boric oxide is introduced and may be employed in rather wide amounts since it is useful for controlling the heat resistance of the fluorapatite opal glass. It is desirably employed in a low alkali content glass. The low refractive index of the borosilicate glass and the high refractive index of fluorapatite cause the fluorapatite opal glasses to be more easily opacified than the fluorine opal glasses, whenever boron is present in high amounts, because the refractive index of sodium and calcium fluoride is low.

Both fluorine and $P_2O_5$ are employed in the ranges indicated and preferably substantially in the indicated ratio. Fluorapatite opalescent glasses can be produced by analogous preparations as the fluorapatite opal glasses by using smaller concentrations of the opacifier, i. e. of $P_2O_5$ and F.

What we claim is:

1. An opal or opalescent glassware composition having a calculated oxide content which is substantially as follows:

| | Percent |
|---|---|
| $SiO_2$ | 59 |
| $Al_2O_3$ | 3 |
| $Na_2O+K_2O$ | 15 |
| $CaO$ | 5 |
| $BaO$ | 5 |
| $PbO$ | 5 |
| $F$ | 3 |
| $P_2O_5$ | 5 |

2. An opal or opalescent glassware composition having a calculated oxide content which is substantially as follows:

| | Percent |
|---|---|
| $SiO_2$ | 56.8 |
| $Al_2O_3$ | 3.4 |
| $Na_2O+K_2O$ | 15.8 |
| $CaO$ | 6.2 |
| $BaO$ | 1.8 |
| $PbO$ | 4.0 |
| $F$ | 3.0 |
| $B_2O_3$ | .75 |
| $As_2O_3$ | 1.00 |
| $P_2O_5$ | 7.25 |

3. An opal or opalescent glassware composition having a calculated oxide content which is substantially as follows:

| | Percent |
|---|---|
| $SiO_2$ | 62 |
| $Al_2O_3$ | 5 |
| $Na_2O+K_2O$ | 14 |
| $CaO$ | 10 |
| $F$ | 4.0 |
| $P_2O_5$ | 5.0 |

4. An opal or opalescent glassware making batch having substantially the following composition:

| | Pounds |
|---|---|
| Sand ($SiO_2$) | 260 |
| Barium borosilicate | 18.5 |
| Barium carbonate | 7.5 |
| Borax ($Na_4B_2O_7 \cdot 10H_2O$) | 4.0 |
| Limestone ($CaCO_3$) | 17.5 |
| Nephelin Syenite | 75.5 |
| Tetrasodium pyrophosphate | 75.0 |
| Sodium nitrate | 8.0 |
| Sodium carbonate | 65.0 |
| Litharge | 22.0 |
| Fluorspar | 33.0 |
| Arsenic trioxide | 3.0 |

5. An opal or opalescent glassware making batch having substantially the following composition:

| | Pounds |
|---|---|
| Sand ($SiO_2$) | 259.5 |
| Barium borosilicate | 18.5 |
| Borax ($Na_4B_2O_7 \cdot 10H_2O$) | 4.0 |
| Barium carbonate | 7.5 |
| Nephelin Syenite | 75.0 |
| Tetrasodium pyrophosphate | 61.0 |
| Sodium nitrate | 8.0 |
| Sodium carbonate | 72.5 |
| Litharge | 22.0 |
| Fluorspar | 32.0 |
| Apatite | 19.0 |
| Arsenic | 3.0 |

6. An opal or opalescent glassware composition having a calculated oxide content which is substantially as follows:

| | Percent |
|---|---|
| $SiO_2$ | 54 to 66 |
| $Al_2O_3$ | 0 to 6 |
| $Na_2O+K_2O$ | 12 to 17 |
| CaO | Up to 12 |
| BaO | Up to 4 |
| PbO | Up to 5 |
| F | 2.5 to 5 |
| $B_2O_3$ | 0 to 50 |
| $As_2O_3$ | 0 to 1 |
| $P_2O_5$ | 4 to 9 | and in which the total of the divalent metals calculated as oxides does not exceed 21% by weight of the composition.

WOLDEMAR WEYL.
NORBERT J. KREIDL.